(12) United States Patent
Woo

(10) Patent No.: US 10,003,595 B2
(45) Date of Patent: Jun. 19, 2018

(54) SYSTEM AND METHOD FOR ONE TIME PASSWORD AUTHENTICATION

(71) Applicant: eStorm Co., LTD, Seoul (KR)

(72) Inventor: Jong Hyun Woo, Seoul (KR)

(73) Assignee: eStorm Co., LTD, Seoul (KR)

( * ) Notice: Subject to any disclaimer, the term of this patent is extended or adjusted under 35 U.S.C. 154(b) by 0 days. days.

(21) Appl. No.: 14/833,155

(22) Filed: Aug. 24, 2015

(65) Prior Publication Data

US 2015/0365402 A1    Dec. 17, 2015

Related U.S. Application Data

(63) Continuation-in-part of application No. PCT/KR2014/001523, filed on Feb. 25, 2014.

(30) Foreign Application Priority Data

Feb. 26, 2013  (KR) .................. 10-2013-0020483
Jul. 22, 2013  (KR) .................. 10-2013-0086354

(51) Int. Cl.
*H04L 29/06* (2006.01)
*H04L 29/12* (2006.01)

(52) U.S. Cl.
CPC ........ *H04L 63/0838* (2013.01); *H04L 63/067* (2013.01); *H04L 63/08* (2013.01);
(Continued)

(58) Field of Classification Search
None
See application file for complete search history.

(56) References Cited

U.S. PATENT DOCUMENTS 7,228,417 B2 * 6/2007 Roskind .................. G06F 21/31
                                                              380/255
7,861,077 B1 * 12/2010 Gallagher ............... G06F 21/33
                                                              713/155
(Continued)

FOREIGN PATENT DOCUMENTS

JP     2006-109152 A    4/2006
KR  10-2009-0019576 A   2/2009
(Continued)

OTHER PUBLICATIONS

Perkins, Charles E. Mobile IP Joins Forces with AAA. IEEE Personal Communications vol. 7, Issue: 4. Pub. Date: 2000. http://ieeexplore.ieee.org/stamp/stamp.jsp?tp=&arnumber=863997.*
(Continued)

*Primary Examiner* — Jeremiah Avery
(74) *Attorney, Agent, or Firm* — Revolution IP, PLLC

(57) ABSTRACT

An authentication system for providing an authentication service for a user accessing the same through a communication network includes a seed server for managing a user seed value related to each user identification information, a one time password (OTP) generation device provided in a user's mobile terminal, the OTP generation device generating a user OTP by using at least one portion previously defined in an IP address dynamically assigned to the mobile terminal by a mobile communication operator and a user's user seed value, and an authentication server for, if a user authentication request is received, generating an OTP corresponding to the user OTP by using the at least one portion previously defined in the IP address dynamically assigned to the mobile terminal and the user seed value related to the user identification information, and comparing the user OTP with the corresponding OTP, thereby authenticating the user.

10 Claims, 10 Drawing Sheets

(52) U.S. Cl.
CPC .......... *H04L 63/18* (2013.01); *H04L 61/1511* (2013.01); *H04L 61/2007* (2013.01)

(56) References Cited

U.S. PATENT DOCUMENTS

| | | | |
|---|---|---|---|
| 8,255,696 B2* | 8/2012 | Florencio | G06F 21/46 705/64 |
| 2003/0110399 A1* | 6/2003 | Rail | H04L 63/0815 726/5 |
| 2003/0159059 A1* | 8/2003 | Rodriquez | G06F 21/31 726/30 |
| 2008/0065892 A1* | 3/2008 | Bailey | H04L 63/0492 713/171 |
| 2008/0301460 A1* | 12/2008 | Miller | H04L 63/0815 713/183 |
| 2010/0250955 A1* | 9/2010 | Trevithick | G06F 21/31 713/185 |
| 2011/0082767 A1* | 4/2011 | Ryu | G06Q 20/32 705/26.35 |
| 2012/0042363 A1* | 2/2012 | Moosavi | H04L 9/3228 726/5 |
| 2012/0240204 A1* | 9/2012 | Bhatnagar | G06F 21/35 726/5 |
| 2012/0266224 A1* | 10/2012 | Gruschka | G06F 21/35 726/7 |
| 2013/0047223 A1* | 2/2013 | Headley | H04L 63/0838 726/5 |

FOREIGN PATENT DOCUMENTS

| | | |
|---|---|---|
| KR | 10-2010-0104161 A | 9/2010 |
| KR | 10-2010-0136572 A | 12/2010 |

OTHER PUBLICATIONS

Lei, Ming; Hong, Xiaoyan; Vrbsky, Susan V. Protecting Location Privacy with Dynamic Mac Address Exchanging in Wireless Networks. IEEE Global Telecommunications Conference, 2007. GLOBECOM '07. Pub. Date: 2007. http://ieeexplore.ieee.org/stamp/stamp.jsp?tp=&arnumber=4410927.*

Agbinya, Johnson I; Islam, Rumana; Kwok, Chandra. Development of Digital Environment Identity (DEITY) System for Online Access. 2008 Third International Conference on Broadband Communications, Information Technology & Biomedical Applications. Pub. Date: 2008. http://ieeexplore.ieee.org/stamp/stamp.jsp?tp=&arnumber=4696077.*

International Search Report for PCT/KR2014/001523 dated May 7, 2014 from Korean Intellectual Property Office.

* cited by examiner ary to a user's mobile terminal by a mobile communication operator (namely, mobile communication service company or mobile carrier), and it is confirmed whether the user is a legal user by using the generated OTP.
SYSTEM AND METHOD FOR ONE TIME PASSWORD AUTHENTICATION

CROSS-REFERENCE TO RELATED APPLICATIONS

The present application is a continuation-in-part (CIP) application of International Application No. PCT/KR2014/001523 filed Feb. 25, 2014, which claims priority to Korean Patent Application Nos. 10-2013-0020483 filed Feb. 26, 2013 and 10-2013-0086354 filed Jul. 22, 2013, which are all hereby incorporated by reference in their entirety.

BACKGROUND

The present invention relates to a system and a method for one time password (OTP) authentication, and more particularly, to a system and a method for OTP authentication, in which an OTP is generated using an IP address assigned to a user's mobile terminal by a mobile communication operator (namely, mobile communication service company or mobile carrier), and it is confirmed whether the user is a legal user by using the generated OTP.

A one time password (OTP) is a user authentication method using an OTP of a random number generated randomly. The OTP has been introduced so as to overcome a weakness in security, which is generated as the same password is repeatedly used.

Currently used types of the OTP are a software type and a hardware type. The software type OTP is operated in a software form in a PC or smart device. Hence, the software type OTP may be copied due to malicious hacking or leakage, and therefore, is weak against security. The hardware type OTP is not widely used in general companies, public institutions, etc. except the financial sector due to inconvenience in carrying, cost required to supply devices, and the like.

In existing OTP methods, an OTP issuing rule (e.g., a seed value or OTP key value) is transmitted/received between a user and a service provider so as to issue and authenticate an OTP. In this case, when the issuing rule is leaked due to a phishing attack or the like, safety is degraded.

Accordingly, a technical method is urgently required which enables a user to confirm whether a service provider is a legal service provider so as to prevent a pharming attack that is a hacking technique.

The following prior documents have been disclosed as conventional arts related to the above-described OTP methods.

Korean Patent Publication No. 10-2010-0104161 (Sep. 29, 2010)

Korean Patent Publication No. 10-2009-0019576 (Feb. 5, 2009)

Korean Patent Publication No. 10-2010-0136572 (Dec. 29, 2010)

SUMMARY

An embodiment of the present invention is directed to a system and a method for one time password (OTP) authentication, which can confirm whether a user is a legal user by using an OTP issued based on an IP address dynamically assigned to a user's mobile terminal by a mobile communication operator when the user's mobile terminal accesses a mobile communication network.

Another embodiment of the present invention is directed to a system and a method for OTP authentication, in which a service OTP of an online service provider is generated by using an IP address of the online service provider which a user intends to access, so that user can confirm whether the online service provider is a legal service provider.

According to an aspect of the present invention, there is provided an authentication system for providing an authentication service for a user accessing the same through a communication network, the authentication system including: a seed server configured to manage a user seed value related to each user identification information; a one time password (OTP) generation device provided in a user's mobile terminal, the OTP generation device generating a user OTP by using at least one portion previously defined in an IP address dynamically assigned to the mobile terminal by a mobile communication operator and a user's user seed value; and an authentication server configured to, if a user authentication request is received, generate an OTP corresponding to the user OTP by using the at least one portion previously defined in the IP address dynamically assigned to the mobile terminal and the user seed value related to the user identification information, and compare the user OTP with the corresponding OTP, thereby authenticating the user.

A mobile terminal identifier may be used as the user identification information. The mobile terminal identifier may be one of a phone number of the mobile terminal, a serial number of the mobile terminal, a number of a USIM card inserted into the mobile terminal, and a push value.

The IP address may be a public or private IP address assigned to the mobile terminal.

The OTP generation device may include a seed reception unit configured to receive and store a user seed value at a point of time when the OTP generation device is first installed and operated in the mobile terminal; a terminal IP acquisition unit configured to, if an OTP generation request is received from the user, acquire an IP address assigned to the mobile terminal; and an OTP generation unit configured to generate a user OTP by using the user seed value and the at least one portion previously defined in the IP address of the mobile terminal, and display the user OTP on a screen of the mobile terminal.

The terminal IP acquisition unit may determine whether the mobile terminal accesses a mobile communication network, and, when the mobile terminal does not access the mobile communication network, induce the mobile terminal to access the mobile communication network.

The authentication server may include a first authentication server and a second authentication server which communicates with the first authentication server and the seed server. If a user authentication request including the user identification information and the user OTP is received from a client terminal separated from the mobile terminal, the first authentication server may request the second authentication server of an OTP corresponding to the user OTP by transmitting the user identification information to the second authentication server. The second authentication server may acquire an IP address assigned to the mobile terminal based on the user identification information, acquire a user seed value related to the user identification information from the seed server, generate an OTP corresponding to the user OTP by using the at least one portion previously defined in the acquired IP address and the user seed value, and compare the user OTP received from the client terminal with the corresponding OTP, thereby authenticating the user.

The authentication system may further include a firewall installed between the second authentication server and the seed server. The seed server is accessible by only the second authentication server.

The OTP generation device may further include an OTP authentication request unit configured to generate an OTP authentication value by using the user identification information and the user seed value, and transmit an OTP generation device authentication request including the generated OTP authentication value and the user identification information to the second authentication server through the mobile terminal. If the OTP authentication request is received from the mobile terminal, the second authentication server may acquire a user seed value related to the user identification information from the seed server by using the user identification information included in the OTP authentication request, generate an OTP authentication value corresponding to the OTP authentication value by using the user identification information and the user seed value, and compare the received OTP authentication value and the generated corresponding OTP authentication value, thereby authenticating the OTP generation device.

The OTP generation device may further include a server IP acquisition unit configured to, if an authentication request including a service identifier for an online service site which the user intends to access is received from the user, acquire an IP address of a service server providing the online service site; and a service OTP generation unit configured to generate a service OTP by using the user seed value and at least one portion previously defined in the acquired IP address of the service server, and display the service OTP on a screen of the mobile terminal.

The server IP acquisition unit may inquire of a domain name system (DNS), thereby acquiring an IP address of a service server providing the online service site.

If a service OTP generation request including user identification information related to the user who intends to access an online service site provided by a service server and an IP address of the service server is received from the service server, the second authentication server may acquire a user seed value related to the user identification information from the seed server in response to the service OTP generation request, generate a service OTP by using the user seed value and at least one portion previously defined in the IP address of the service server, and transmit the generated service OTP to the service server. The service server may display the service OTP in the online service site, so that the user compares a service OTP displayed on a screen of the mobile terminal with the service OTP displayed in the online service site, thereby authenticating the online service site.

According to another aspect of the present invention, there is provided a method for authenticating an online service site in an authentication system including a service server for providing the online service site, an authentication server for generating a service OTP for the service server, and a seed server for providing a user seed value to the authentication server while communicating with the authentication server, the method including: receiving, by the authentication server, from the service server, a service OTP generation request including user identification information related to a user who intends to access the online service site and an IP address of the service server; acquiring, by the authentication server, a user seed value related to each user identification information from the seed server in response to the service OTP generation request; generating, by the authentication server, a service OTP by using at least one portion previously defined in the IP address of the service server, and transmitting the generated service OTP to the service server; and displaying, by the service server, the service OTP in an online service site which the user accesses, wherein the user compares a service OTP generated by a mobile terminal, wherein the service OTP is generated by using the at least one portion previously defined in the IP address of the service server and the user seed value, acquired by the user identification information, with the service OTP displayed in the online service site, thereby authenticating the online service site.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

According to an embodiment of the present invention, since an OTP is generated by using a user's mobile terminal, it is unnecessary to carry a separate OTP device. In addition, although an OTP app (i.e. application software) installed in a mobile terminal is copied and leaked, the mobile terminal is operable only when the corresponding app is registered to the same device of the same communication service provider such that the corresponding app is operated.

Also, according to an embodiment of the present invention, since a mobile communication operator cannot assign the same IP address to two mobile terminals, hacking is still difficult even though the existing fixed OTP key is exposed due to a phishing attack.

Also, according to an embodiment of the present invention, when an inverse OTP (namely, service OTP) is generated by using an IP address of an online service provider in a user's mobile terminal, and the user accesses a site of the corresponding service provider, the service provider notifies the inverse OTP, so that it is possible to prevent a pharming attack that has recently been problematic.

DETAILED DESCRIPTION

Figure 1:
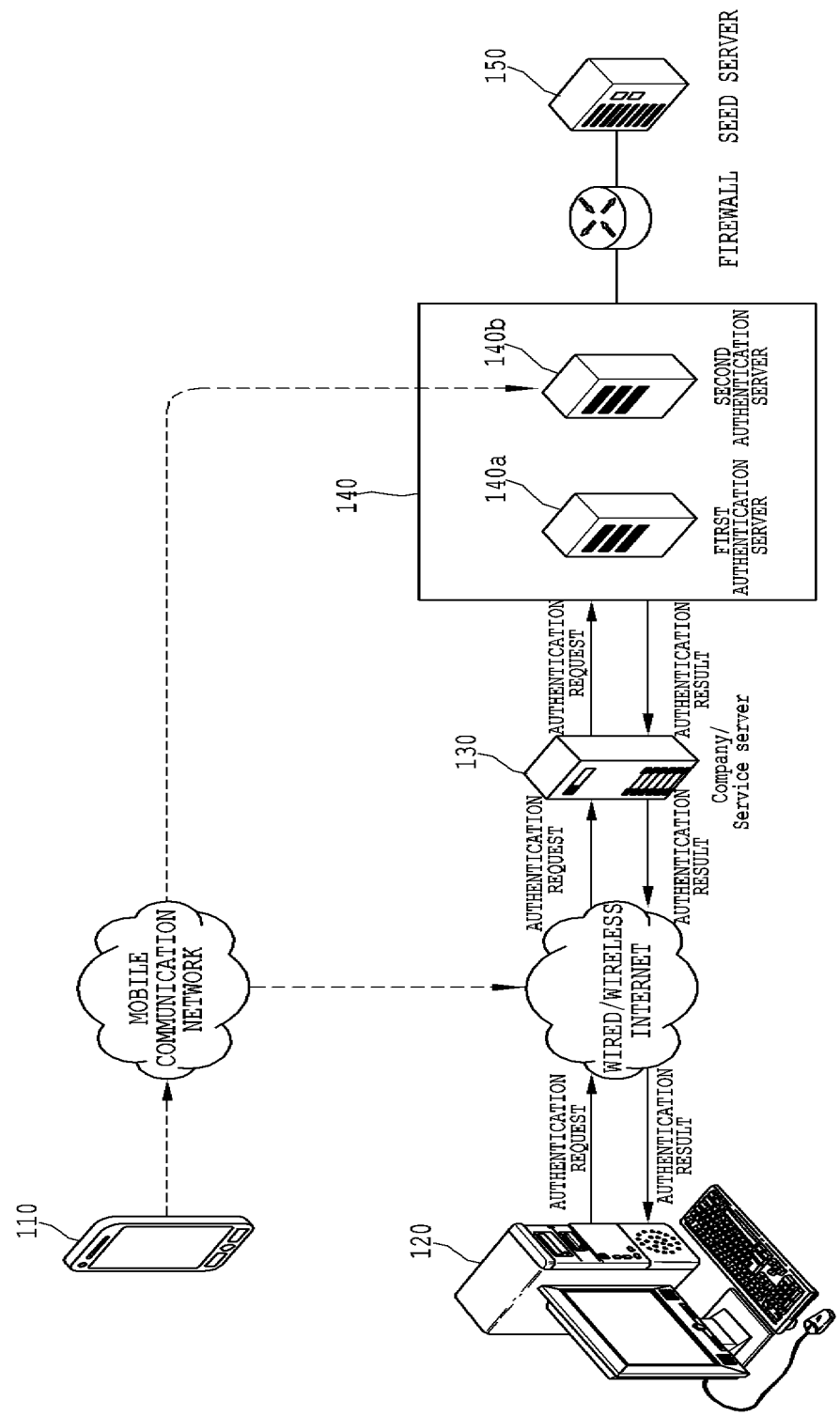
FIG. 1 is a diagram illustrating an environment of an authentication system according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be further understood that the terms "comprises" and/or "comprising," or "includes" and/or "including" when used in this specification, specify the presence of stated elements, and/or components, but do not preclude the presence or addition of one or more other elements and/or components thereof. The terms "unit," "module" and the like used in this specification refer to units processing at least one function or operation and may be implemented by hardware, software, or a combination thereof.

FIG. 1 is a diagram illustrating an environment of an authentication system according to an embodiment of the present invention. As shown in this figure, when a user intends to access a server 130, e.g., a company intranet server, a web service server, or the like, which requires a user authentication, through a client terminal 120, the authentication system according to the embodiment of the present invention requests the user of a user authentication by using a user one time password (OTP) generated using an OTP generation device (not shown) installed in a user's mobile terminal 110.

The mobile terminal 110 may be a cellular phone, a smart phone, a notebook computer, a mobile terminal for digital broadcasting, a PDA, a navigation, etc. The mobile terminal 110 is not limited to any specific kind as long as it is a terminal capable of performing wireless communication through access to a mobile communication network such as 3G/LTE.

The OTP generation device (not shown) according to the embodiment of the present invention may be installed in the mobile terminal 110. In an embodiment, the OTP generation device may acquire an IP address dynamically assigned to the mobile terminal 110 by a mobile communication operator, and generate a user OTP by using the acquired IP address (the whole or one portion previously defined) and a user seed value assigned to the user.

That is, according to the embodiment of the present invention, the user OTP is generated by using, as one parameter for OTP generation, the user seed value and the IP address dynamically assigned to the user's mobile terminal 110 by the mobile communication operator. Therefore, it will be apparent that a method of further adding an OTP generation parameter may be within the scope of the present invention, within the limit that the user seed value and the IP address of the mobile terminal are used as the OTP generation parameter. For example, at least one of a time (information on a point of time when the OTP is generated), a number of times (information on a number of times of attempting to generate the OTP), and a push ID, push value, or push token value of an OTP generation application (app) may be further added as the OTP generation parameter for generating the user OTP. Also, it will be obvious that a specific hash function may be used in an operation of generating a user OTP by using the above-described OTP generation parameters. This may be identically applied throughout the entire description related to the generation of the user OTP in this specification, and may be identically or similarly applied in a process of generating a service OTP, which will be described later.

In another embodiment, the OTP generation device may generate a service OTP by using the user seed value and the whole or a portion of an IP address of an online service site (server) which the user intends to access.

The OTP generation device is provided in the form of an application program (app) to be stored in a memory of the mobile terminal 110 and be executable under control of a process of the mobile terminal 110. The OTP generation device may be downloaded from an authentication server 140 or a separate OTP service server (not shown) to be installed in the mobile terminal 110. The above-described OTP generation device will be described in detail with reference to FIG. 2.

The client terminal 120 may be used for the user to access the company intranet server/web service server 130 through wired/wireless Internet. The client terminal 120 may be a PC, a notebook computer, a smart phone, a PDA, a navigation, etc. The client terminal 120 is not limited to any specific kind as long as it is a terminal capable of performing wired/wireless Internet communication. In an embodiment, an OTP locking program (not shown) may be installed in the client terminal 120. The OTP locking program may simultaneously transmit an OTP value input from the user and a user's mobile terminal identifier to the authentication server 140 and the company intranet server/web service server 130, to maintain a screen of the client terminal 120 in a locking state until an authentication result is received after a user authentication is requested and then release or maintain the locking state of the corresponding screen.

In this case, the mobile terminal identifier is not limited to its type as long as it is a number capable of identifying a mobile terminal, such as a phone number of the mobile terminal, a serial number of the mobile terminal, or a number of a USIM card inserted into the mobile terminal. In this specification, a case where a mobile terminal identifier is used as reference information for identifying a user seed value and an IP address dynamically assigned to a mobile terminal will be mainly described hereinbelow. However, it will be apparent that, in addition to the mobile terminal identifier, another user identification information (e.g., personal identification information such as a user ID, a password, or a user's home address) as the reference information for identifying the user seed value and the IP address of the mobile terminal. However, for convenience and concentration of description, a case where a mobile terminal identifier in the user identification information is used will be described hereinbelow.

Meanwhile, in an alternative embodiment, the user may access a site provided from the company intranet server/web service server 130 through the wired/wireless Internet by using the mobile terminal 110. In this case, OTP generation and access to an intranet/website may be performed in the same mobile terminal 110.

The company intranet server/web service server 130 is a server which requires a user authentication process such that a user accesses the company intranet server/web service server 130. It is obvious to those skilled in the art that the scope of the present invention is not limited to the types of services provided by the server 130. Hereinafter, for convenience of description, the company intranet server/web service server 130 will be commonly referred to as a 'service server.'

In an embodiment, an OTP locking program (not shown) may be installed in the service server 130. The OTP locking program installed in the service server 130 may perform a primary user authentication by using a user ID/password that the user inputs to access the service server 130, search a mobile terminal identifier related to the corresponding user ID, request a user authentication by simultaneously transmitting, to the authentication server 140, a user OTP input from the user and the searched mobile terminal identifier, and then release or maintain the locking of a website based on the authentication result.

According to another embodiment of the present invention, the service server 130 may display a service OTP on a site so as to allow the user to confirm that the site provided by the service server 130 is legal. To this end, the service server 130 may transmit, to the authentication server 140, a mobile terminal identifier of a user who intends to access an online service site provided by the service server 130 and a service OTP generation request including an IP address of the service server, and display the received service OTP at a specific portion of a screen displayed to the user.

If a user authentication request including a mobile terminal identifier and a user OTP is received through the mobile terminal 110, the client terminal 120, or the service server 130, the authentication server 140 may generate an OTP corresponding to the user OTP included in the user authentication request by using an IP address assigned to the user's mobile terminal and a user seed value related to the mobile terminal identifier, and compare the user OTP with the corresponding OTP, thereby performing authentication on the user. In an embodiment, in order to secure the authentication, a firewall may be installed between the service server 130 and the authentication server 140.

In an embodiment, the authentication server 140 may include a first authentication server 140a and a second authentication server 140b which communicates with the first authentication server 140a and a seed server 150. If a user authentication request including a mobile terminal identifier and a user OTP is received, the first authentication server 140a may request an OTP corresponding to the user by transmitting the mobile terminal identifier to the second authentication server 140b.

The second authentication server 140b may acquire an IP address assigned to the mobile terminal 110 and a user seed value related to the mobile terminal identifier, generate an OTP corresponding to the user OTP by using the acquired IP address and user seed value, and transmit the generated OTP to the first authentication server 140a.

In an embodiment, the IP address of the mobile terminal 110 may be acquired from a mobile communication operator system (not shown). The second authentication server 140 may acquire an IP address of a mobile terminal by inquiring of the mobile communication operator system about the IP address of the corresponding mobile terminal by using the mobile terminal identifier.

Alternatively, if the OTP generation device is operated in the mobile terminal 110, an IP address of a mobile terminal may be acquired. In this case, the acquired IP address of the mobile terminal may be transmitted together with the mobile terminal identifier to the second authentication server 140b.

In an embodiment, the user seed value may be acquired by inquiring of the seed server 150 by using the mobile terminal identifier.

Accordingly, the first authentication server 140a compares the user OTP included in the user authentication request with the corresponding OTP generated by the second authentication server 140b, so that it is possible to perform authentication on the user and provide an authentication result to the service server 130.

Figure 7:
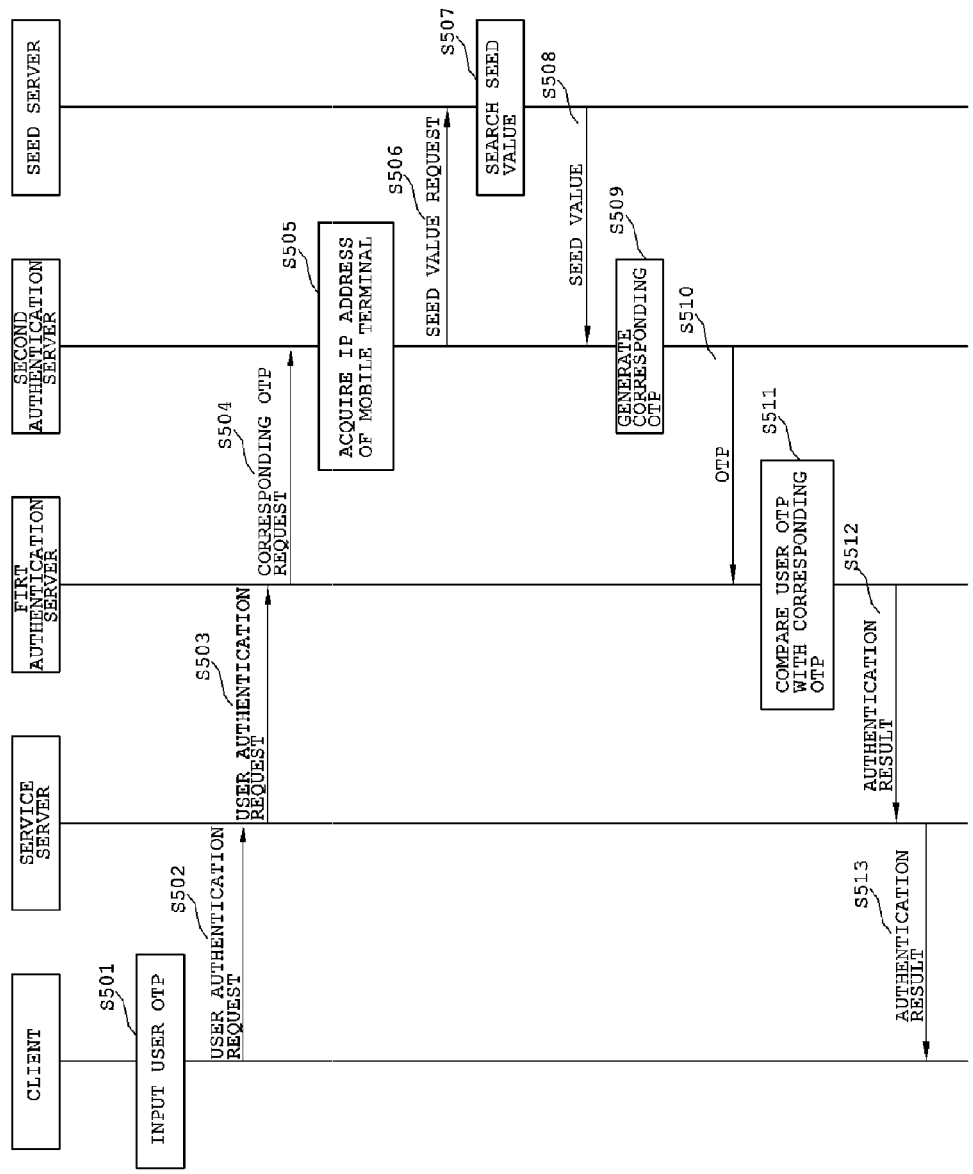
FIG. 7 illustrates a user authentication process according to an embodiment of the present invention.

In the above, the case of transmitting, to the first authentication server 140a, the corresponding OTP generated by the second authentication server 140b, and performing OTP comparison in the first authentication server 140a based on the transmitted OTP has been described. However, it will be apparent that, according to embodiments, the OTP comparison may be performed in the second authentication server 140b. For convenience and concentration of description, a case of performing OTP comparison in the first authentication server 140a is illustrated in the flowchart of FIG. 7, which will be described later.

If a service OTP generation request including a mobile terminal identifier related to a user who intends to access an online service site provided by the service server 130 and an IP address of the service server 130 is received through the first authentication server 140a from the service server 130, the second authentication server 140b may acquire, from the seed server 150, a user seed value related to the mobile terminal identifier in response to the received service OTP generation request, and apply a hash function to the IP address of the service server 130, thereby generating a service OTP and transmitting the generated OTP to the service server 130.

The seed server 150 is a server which manages a user seed value provided to a user of a corresponding mobile terminal for each mobile terminal identifier. In an embodiment, the security of the seed server 150 which manages user seed values used to generate OTPs in the authentication system of the present invention is very important, and therefore, only the second authentication server 140b may be limited to be accessible to the seed server 150 so as to prevent the leakage of seed values. In this case, a firewall may be installed between the second authentication server 140b and the seed server 150, thereby reinforcing the security of the seed server 150.

In FIG. 1, it has been illustrated that the authentication server 140 and the seed server 150 are separated from each other with the firewall interposed therebetween. However, the authentication server 140 and the seed server 150 may be integrally managed as one integrated authentication center. According to embodiments, the second authentication server 140b and the seed server 150 may be operated as one server.

Figure 2:
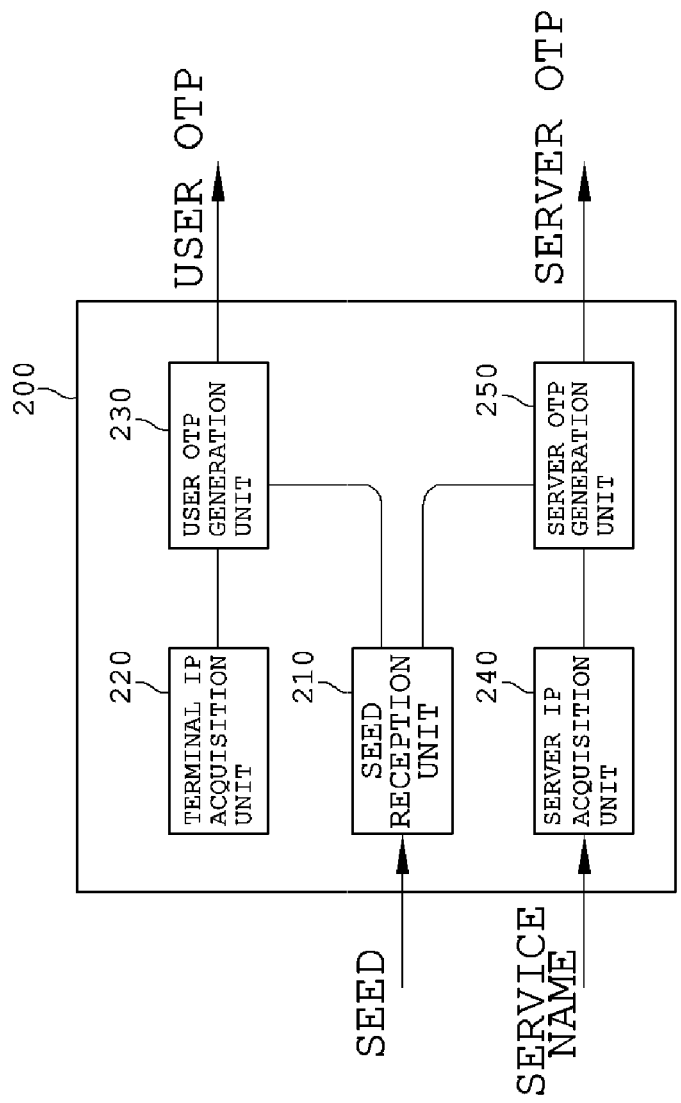
FIG. 2 is a block diagram of a one time password (OTP) generation device according to an embodiment of the present invention.

FIG. 2 is a block diagram of an OTP generation device according to an embodiment of the present invention.

As described above, the OTP generation device 200 may be implemented in the form of an app operated in a mobile terminal. The OTP generation device 200 may include a seed reception unit 210, a terminal IP acquisition unit 220, a user OTP generation unit 230, a server IP acquisition unit 240, and a service OTP generation unit 250.

The seed reception unit 210 receives, from a user, a user seed value used to generate an OTP. In an embodiment, the user may receive a user seed value in various manners including a confrontational manner (e.g., a paper, a card, etc.) or a non-confrontational manner (e.g., SMS or Internet) and then input the user seed value at a point of time when the OTP generation device 200 is first operated in a user's mobile terminal or whenever the OTP generation device 200 is operated in the user's mobile terminal.

The terminal IP acquisition unit 220 acquires an IP address dynamically assigned, by a mobile communication operator, to a mobile terminal in which the OTP generation unit 200 is operated. In an embodiment, the terminal IP acquisition unit 220 may determine whether a mobile terminal accesses a mobile communication network. When the mobile terminal does not access the mobile communication network, the terminal IP acquisition unit 220 may induce the mobile terminal to access the mobile communication network.

In an embodiment, the IP address dynamically assigned by the mobile communication operator may be a public or private IP address provided from the mobile communication operator. The mobile communication operator does not provide a public IP address to all subscribers of the mobile communication operator but may provide a private IP address to all the subscribers and provide the public IP address by using Internet user network address translation (NAT), so that Internet services can be used in a smart phone. Therefore, an OTP may be generated by using the public or private IP address. According to embodiments, an OTP may be generated by using both the public and private IP addresses.

The user OTP generation unit 230 generates a user OTP by applying a hash function to the user seed value and the IP address of the mobile terminal, and displays the generated user OTP on a screen of the mobile terminal. In an embodiment, the user OTP generation unit 230 may also use an OTP generation time or a number of times of OTP generation as dynamic seed values, in addition to the user seed value and the IP address of the mobile terminal. The user OTP displayed on the screen of the mobile terminal may be input to a client terminal (or re-input to the mobile terminal) by the user, to be used for a user authentication request.

Alternatively, the user OTP generation unit 230 may convert the IP address of the mobile terminal, acquired by the terminal IP acquisition unit 220, into another value by primarily applying a first hash function, etc. to the IP address of the mobile terminal, and then generate a user OTP by secondarily applying a second hash function to the user seed value and the value obtained by applying the first hash function to the IP address of the mobile terminal, so that it is possible to further reinforce OTP security.

If a service authentication request including a service identifier for an online service site that the user intends to access is received, the server IP acquisition unit 240 may acquire an IP address of a service server which provides the online service site. In an embodiment, the user does not directly input an IP address of a site to be accessed but may input a service domain name or select an icon related to the service domain name, thereby requesting service authentication. The server IP acquisition unit 240 may inquire of a domain name server (DNS) through an nsLookup command, thereby identifying which IP address a domain server of a corresponding service uses to be operated.

The service OTP generation unit 250 may generate a service OTP by using the user seed value, the IP address of the service server, acquired by the server IP acquisition unit 240, or a portion of the IP address, and display the generated service OTP on a screen of the mobile terminal. In an embodiment, when the IP address acquired by the server IP acquisition unit 240 is provided in plurality, the service OTP generation unit 250 may generate a service OTP by selecting an IP address configured with the smallest number (or the greatest number) among the plurality of IP addresses.

The user compares a service OTP displayed in the mobile terminal with a service OTP displayed in an online service site to be accessed, thereby confirming whether the corresponding site is a legal site.

The OTP generation device 200 may further include an OTP authentication request unit (not shown) which transmits an authentication request related to the OTP generation device, including the generated OTP authentication value and the mobile terminal identifier, to the second authentication server through the mobile terminal. The second authentication server 140b receiving the authentication request related to the OTP generation unit acquires a user seed value related to the mobile terminal identifier from the seed server 150 by using the mobile terminal identifier included in the authentication request related to the OTP generation device, generates an OTP authentication value corresponding to the OTP authentication value included in the OTP authentication request by using the mobile terminal identifier and the user seed value, and compares the generated corresponding OTP authentication value with the OTP authentication value, thereby performing authentication on the OTP generation device.

Figure 3:
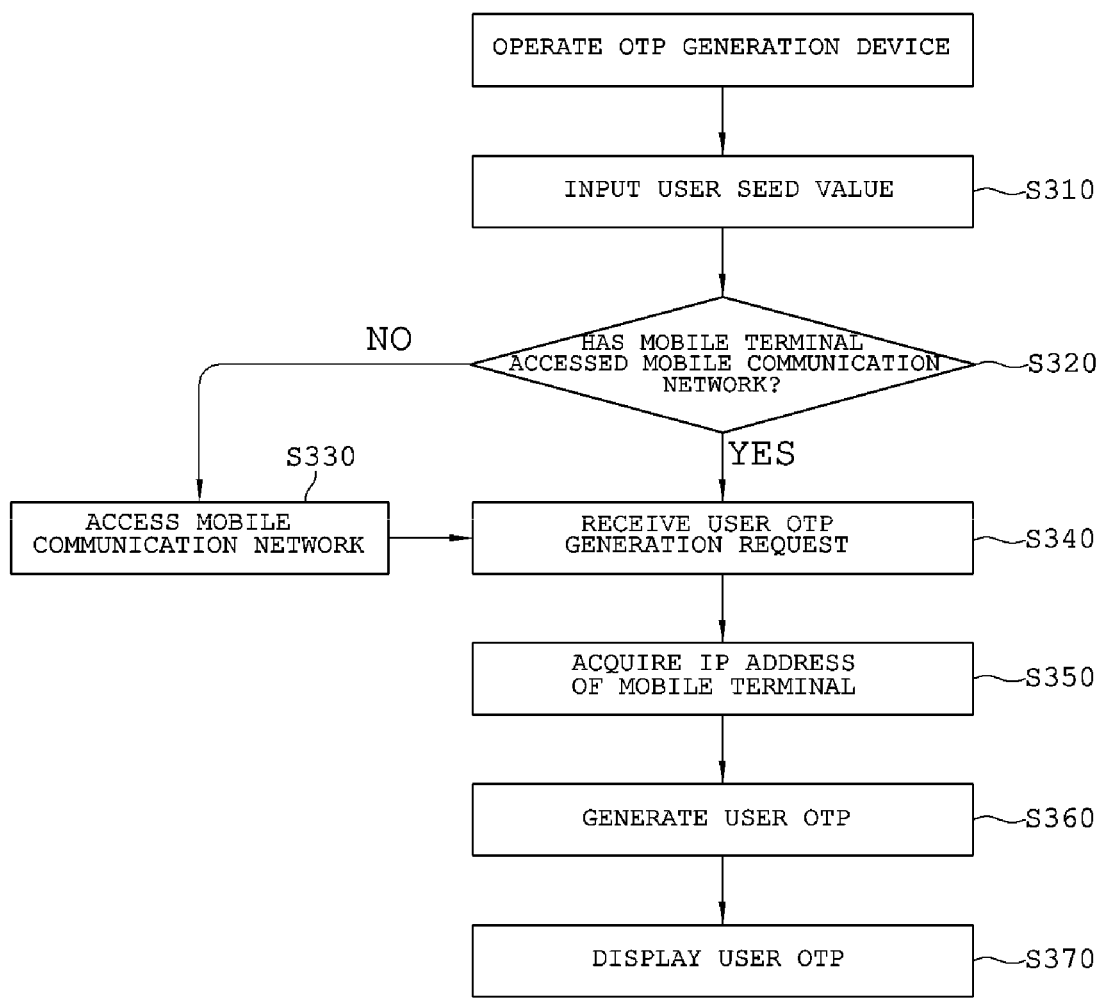
FIG. 3 is a flowchart illustrating a process of generating a user OTP in a mobile terminal according to an embodiment of the present invention.

FIG. 3 is a flowchart illustrating a process of generating a user OTP in a mobile terminal according to an embodiment of the present invention. If an OTP generation device (app) is operated by a user's manipulation in a user's mobile terminal, the user may be requested to input a user seed value (S310). The user seed value may be input only once at a point of time when the OTP generation device is first operated, and then stored in the mobile terminal to be used for any subsequent OTP generation. Alternatively, the user may be requested to input a user seed value whenever the OTP generation app is operated for the purpose of security. According to another embodiment, the user seed value is not directly input by the user but may be automatically input by the OTP generation app.

First, it is confirmed whether the mobile terminal accesses a mobile communication network (S320). If the mobile terminal does not access the mobile communication network, the access of the mobile terminal to the mobile communication network is induced (S330).

A user OTP generation request is received from the user (S340).

An IP address dynamically assigned to the mobile terminal, in which the OTP generation device is operated, by a mobile communication operator, is acquired (S350).

In an embodiment, the acquired IP address of the mobile terminal may be provided together with a mobile terminal identifier to a second authentication server, to be used to generate a corresponding OTP of the second authentication server. That is, a user OTP is generated by using the user seed value and the IP address (or a portion of the IP address) of the mobile terminal (S360).

The user OTP generated in step S360 is displayed on a screen of the mobile terminal (S370).

Figure 4:
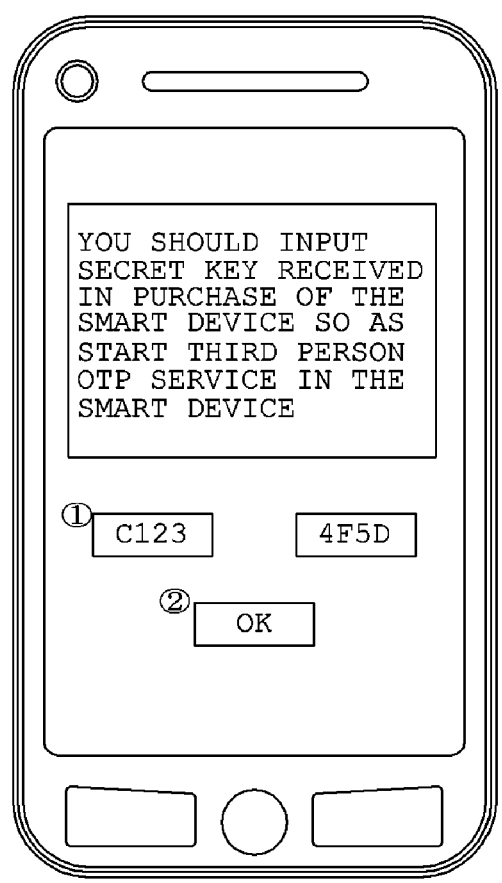
FIGS. 4 to 6 illustrate examples of screens of a mobile terminal in which an OTP generation device is operated according to an embodiment of the present invention.
Figure 5:
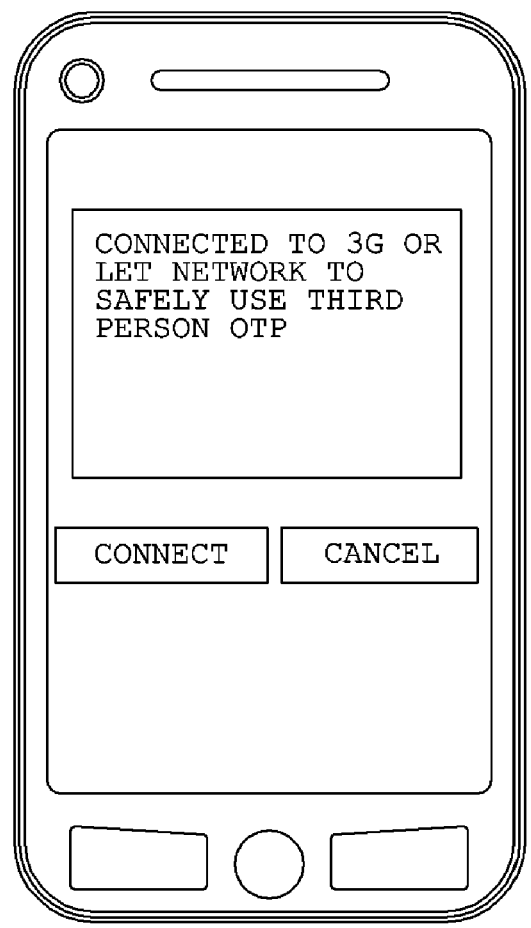
Figure 6:
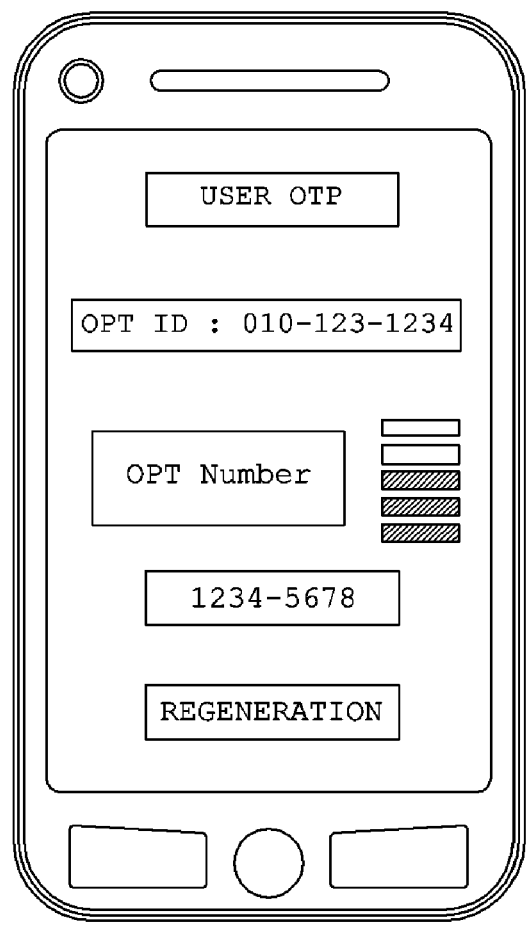

FIGS. 4 to 6 illustrate examples of screens of a mobile terminal in which an OTP generation device is operated according to an embodiment of the present invention. FIG. 4 illustrates an example of a screen on which a user inputs a user seed value. FIG. 5 illustrates an example of a screen on which, when the mobile terminal does not access a mobile communication network, the access of the mobile terminal to the mobile communication network is induced. FIG. 6 illustrates an example in which a user OTP is generated to be displayed on a screen of the mobile terminal.

FIG. 7 illustrates a user authentication process according to an embodiment of the present invention.

In step S501, a user may input, to a client terminal, a user OTP generated by using an OTP generation device provided in a user's mobile terminal for the purpose of user authentication. In this figure, it is described that the user inputs a user OTP to the client terminal. However, in another embodiment, when the user intends to receive an online service by using the mobile terminal in which an OTP is generated, the user may input a user OTP to the mobile terminal.

If a user OTP is input from the user, the client terminal transmits, to a first authentication server, a user authentication request including the user OTP input from the user and a user's mobile terminal identifier, through a service server (S502, and S503).

If the user authentication request is received, the first authentication server requests the second authentication server of an OTP corresponding to the user OTP by transmitting the mobile terminal identifier to the second authentication server (S504).

If a corresponding OTP generation request is received from the first authentication server, the second authentication server acquires an IP address of the user's mobile terminal (S505). The IP address of the mobile terminal may be acquired by inquiring of a mobile communication operator system, using the mobile terminal identifier. Alternatively, the second authentication server may receive a mobile IP acquired by the OTP generation device operated in the mobile terminal.

Next, the second authentication server requests a seed server of a user seed value related to the mobile terminal identifier (S506). If the seed server searches a user seed value (S507) and returns the user seed value to the second authentication server (S508), the second authentication server generates a corresponding OTP by using the user seed value and the IP address (or a portion of the IP address) of the mobile terminal (S509). The generated corresponding OTP is transmitted to the first authentication server (S510).

The first authentication server authenticates the user by comparing the user OTP included in the user authentication request with the corresponding OTP received from the first authentication server (S511), and transmits an authentication result to the client terminal through the service server.

Figure 8:
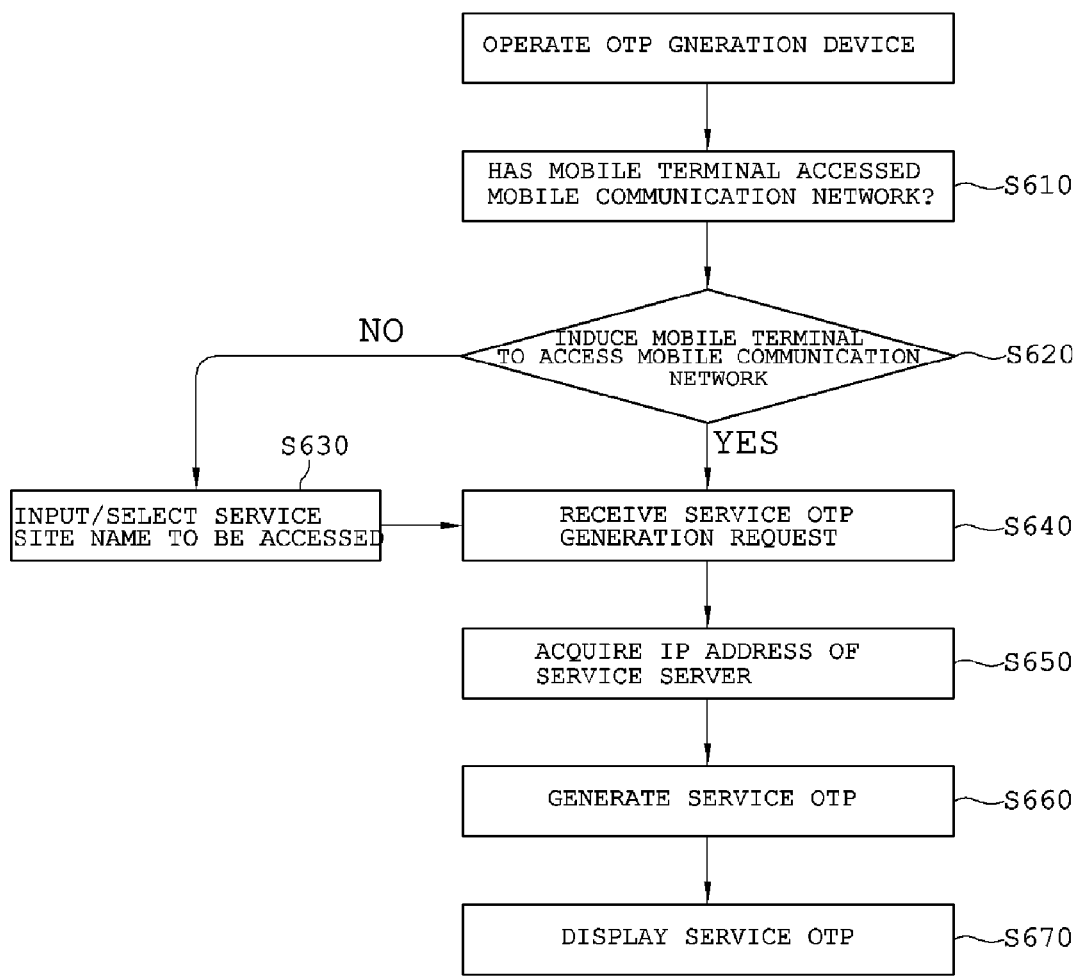
FIG. 8 illustrates a process of generating a service OTP in a mobile terminal according to an embodiment of the present invention.

FIG. 8 illustrates a process of generating a service OTP in a mobile terminal according to an embodiment of the present invention.

If an OTP generation device (app) is operated by a user's manipulation in a user's mobile terminal, it is confirmed whether the mobile terminal accesses a mobile communication network (S610). If the mobile terminal does not access the mobile communication network, the access of the mobile terminal to the mobile communication network is induced (S620).

In step S630, a domain name related to an online service site to be accessed is input from the user, or an icon representing a specific domain is selected from the user. In step S640, a service OTP generation request for the corresponding online service site is received.

In step S650, an IP address of a service server which provides the online service site to be accessed is acquired. In an embodiment, a DNS server is inquired about the IP address of the service domain name input or selected in step S630, thereby acquiring the IP address of the corresponding service server.

In step S660, a service OTP is generated by applying a hash function to a user seed value and the IP address (or a portion of the IP address) of the service server. In this case, it is considered that the user seed value was previously input and stored by the user at a point of time when the OTP generation device was operated. However, according to embodiments, the user may be requested to re-input a user seed value.

In step S670, the service OTP generated in step S660 is displayed on a screen of the mobile terminal.

Figure 9:
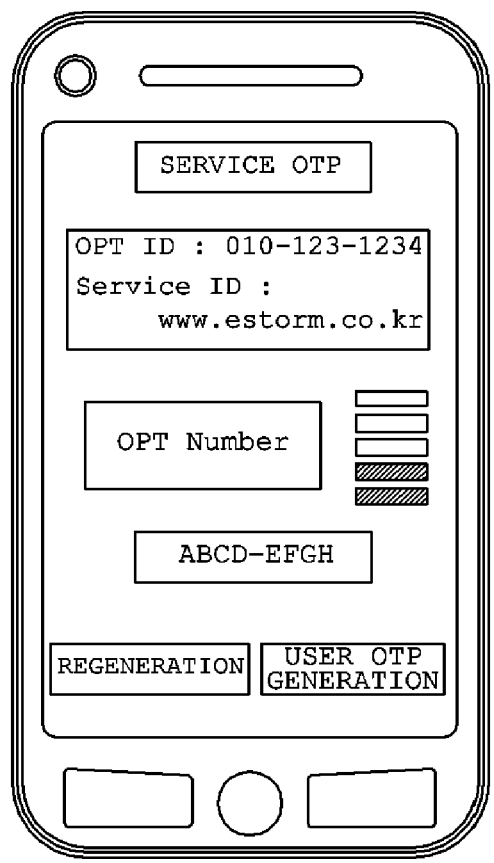
FIG. 9 illustrates an example of a screen of a mobile terminal, which displays a generated service OTP according to an embodiment of the present invention.

FIG. 9 illustrates an example of a screen of a mobile terminal, on which a generated service OTP is displayed according to an embodiment of the present invention. As shown in this figure, the service OTP generated with respect to "www.estorm.co.kr" as a service site which a user intends to access is "ABCD-EFGH." In this figure, the service OTP is displayed as an English string. However, the service OTP may be expressed as a color, a symbol, or the like according to its implementation.

Figure 10:
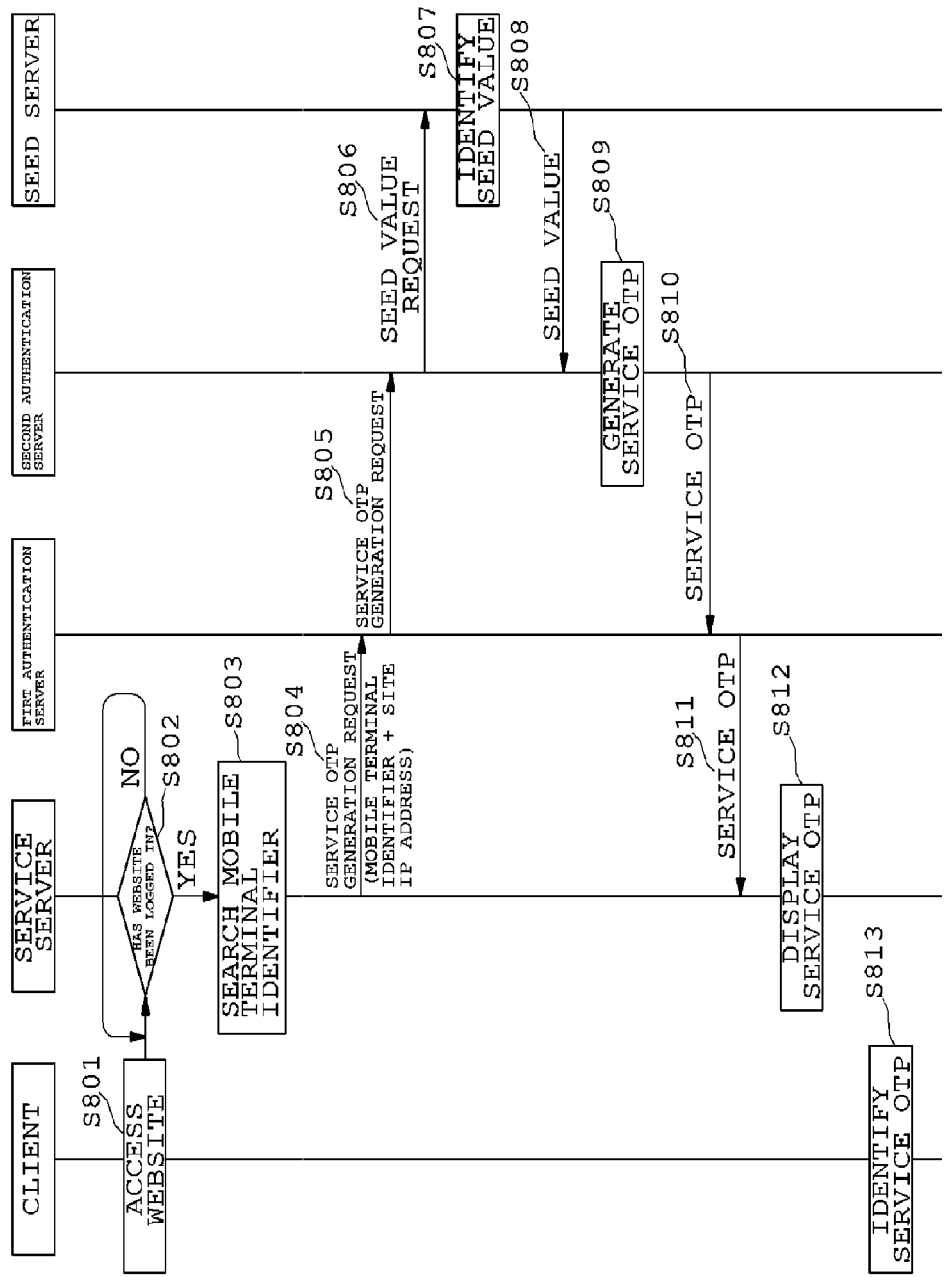
FIG. 10 illustrates a service authentication process according to an embodiment of the present invention.

FIG. 10 illustrates a service authentication process according to an embodiment of the present invention.

A user accesses a website in a client terminal (S801), and logs in the website by inputting a user ID/password. A service server providing the corresponding website primarily performs a user authentication by identifying the user ID/password input from the user (S802).

Subsequently, the service server searches a mobile terminal identifier related to the user ID of the logged-in user (S803), and transmits, to a first authentication server, a service OTP generation request including the searched mobile terminal identifier and an IP address of the service server (S804).

The first authentication server transmits, to a second authentication server, the service OTP generation request received from the service server (S805).

The second authentication server receiving the service OTP generation request requests a seed server of a user seed value (S806). The seed server identifies a user seed value related to the user's mobile terminal identifier in response to a user seed value request of the second authentication server (S807), and transmits the identified user seed value to the second authentication server (S808).

The second authentication server generates a service OTP by applying a hash function to the user seed value and the IP address of the service server (S809), and transmits the generated service OTP to the service server through the first authentication server (S810 and S811).

The service server displays the service OTP in an online service site which the user accesses (S812).

The user compares a service OTP generated by the user's mobile terminal with the service OTP displayed in the online service site, thereby confirming whether the online service site is a valid site.

The service authentication process through the above-described service OTP generation may be independently performed, or may be performed together with the user authentication process described with reference to FIG. 7. Preferably, the user confirms whether the corresponding service site is a valid service site by using the service OTP before the user authentication process using the user OTP is performed, thereby preventing a pharming attack. After the validity of a service site to be accessed is determined using the service OTP, the user authentication process using the user OTP may be performed.

The system and method according to the embodiments of the present invention may be implemented in a program command form capable of being performed through various computer means to be recorded in a computer-readable recording medium. The computer-readable recording medium may include a program command, a data file, a data structure, and the like separately or in a combination thereof.

The program command recorded in the recording medium may be a command designed or configured specially for the present invention, or usably known to a person having ordinary skill in the computer software art. Examples of the computer-readable recording medium include magnetic media such as hard disks, floppy disks, and magnetic tapes, optical media such as CD-ROM and DVD, magneto-optical media such as floppy disks, and a hardware device such as ROM, RAM, and flash memory, which is configured to store and perform program commands. Also, the above-described medium may be a transmission medium that transmits signals designating program commands, data structures, etc. Examples of the program commands include a machine language code made by a compiler and a high-level language code implemented using an interpreter by a computer.

While the present invention has been described with respect to the specific embodiments, it will be apparent to those skilled in the art that various changes and modifications may be made without departing from the spirit and scope of the invention as defined in the following claims.

The invention claimed is:

1. An authentication system for providing an authentication service for a user accessing the same through a communication network, the authentication system comprising:
   a seed server configured to manage a user seed value related to each user identification information;
   a one time password (OTP) generation device provided in a user's mobile terminal, the OTP generation device generating a user OTP by using at least one portion previously defined in an internet protocol (IP) address dynamically assigned to the mobile terminal by a mobile communication operator and a user's user seed value;
   a service server configured to send a user authentication request including the user identification information and the user OTP, wherein the service server providing an online service site which the user intends to access is configured to receive the user OTP from the user; and
   an authentication server received the user authentication request configured to:
      acquire the IP address assigned to the mobile terminal based on the user identification information;
      acquire the user seed value related to the user identification information from the seed server;
      generate an OTP corresponding to the user OTP by using the at least one portion previously defined in the acquired IP address and the user seed value; and
      compare the user OTP received from the client terminal with the corresponding OTP, thereby authenticating the user.

2. The authentication system of claim 1, wherein a mobile terminal identifier is used as the user identification information, and
   wherein the mobile terminal identifier is one of a phone number of the mobile terminal, a serial number of the mobile terminal, a number of a universal subscriber identity module (USIM) card inserted into the mobile terminal, and a push value.

3. The authentication system of claim 1, wherein the IP address is a public or private IP address assigned to the mobile terminal.

4. The authentication system of claim 1, wherein the OTP generation device includes a non-transitory computer-readable storage device, wherein a plurality of parts are implemented in the storage device, the parts comprising:
   a seed reception part configured to receive and store a user seed value at a point of time when the OTP generation device is first installed and operated in the mobile terminal;
   a terminal IP acquisition part configured to, if an OTP generation request is received from the user, acquire an IP address assigned to the mobile terminal; and
   an OTP generation part configured to generate a user OTP by using the user seed value and the at least one portion previously defined in the IP address of the mobile terminal, and display the user OTP on a screen of the mobile terminal.

5. The authentication system of claim 4, wherein the terminal IP acquisition part determines whether the mobile terminal accesses a mobile communication network, and, when the mobile terminal does not access the mobile communication network, induces the mobile terminal to access the mobile communication network.

6. The authentication system of claim 1, wherein the authentication server includes a first authentication server and a second authentication server which communicates with the first authentication server and the seed server,
   wherein, if the user authentication request is received from the service server, the first authentication server requests the second authentication server of an OTP corresponding to the user OTP by transmitting the user identification information to the second authentication server, and
   wherein the second authentication server acquires an IP address assigned to the mobile terminal based on the user identification information, acquires a user seed value related to the user identification information from the seed server, generates an OTP corresponding to the user OTP by using the at least one portion previously defined in the acquired IP address and the user seed value, and compares the user OTP received from the client terminal with the corresponding OTP, thereby authenticating the user.

7. The authentication system of claim 6, wherein the OTP generation device generates an OTP authentication value by using the user identification information and the user seed value, and transmit an OTP generation device authentication request including the generated OTP authentication value and the user identification information to the second authentication server through the mobile terminal, and
   wherein, if the OTP authentication request is received from the mobile terminal, the second authentication server acquires a user seed value related to the user identification information from the seed server by using the user identification information included in the OTP authentication request, generates an OTP authentication value corresponding to the OTP authentication value by using the user identification information and the user seed value, and compares the received OTP authentication value and the generated corresponding OTP authentication value, thereby authenticating the OTP generation device.

8. The authentication system of claim 4, wherein the OTP generation device further includes:
   a server IP acquisition part configured to, if an authentication request including a service identifier for an online service site which the user intends to access is received from the user, acquire an IP address of a service server providing the online service site; and
   a service OTP generation part configured to generate a service OTP by using the user seed value and at least one portion previously defined in the acquired IP address of the service server, and display the service OTP on a screen of the mobile terminal.

9. The authentication system of claim 8, wherein the server IP acquisition part inquires of a domain name system (DNS), thereby acquiring an IP address of a service server providing the online service site.

10. The authentication system of claim 9, wherein, if a service OTP generation request including user identification information related to the user who intends to access an online service site provided by a service server and an IP address of the service server is received from the service server, the second authentication server acquires a user seed value related to the user identification information from the seed server in response to the service OTP generation request, generates a service OTP by using the user seed value and at least one portion previously defined in the IP address of the service server, and transmits the generated service OTP to the service server, and wherein the service server displays the service OTP in the online service site, so that the user compares a service OTP displayed on a screen of the mobile terminal with the service OTP displayed in the online service site, thereby authenticating the online service site.

* * * * *